(12) United States Patent
Lange

(10) Patent No.: US 7,631,491 B2
(45) Date of Patent: Dec. 15, 2009

(54) METHOD AND SYSTEM FOR PASSIVE REGENERATION OF COMPRESSION IGNITION ENGINE EXHAUST FILTERS

(75) Inventor: Cameron Thomas Lange, Dearborn Heights, MI (US)

(73) Assignee: Detroit Diesel Corporation, Detroit, MI (US)

( * ) Notice: Subject to any disclaimer, the term of this patent is extended or adjusted under 35 U.S.C. 154(b) by 302 days.

(21) Appl. No.: 11/599,770

(22) Filed: Nov. 15, 2006

(65) Prior Publication Data

US 2008/0134669 A1    Jun. 12, 2008

(51) Int. Cl.
*F01N 3/00*    (2006.01)

(52) U.S. Cl. .............................. 60/295; 60/274; 60/277; 60/285; 60/297; 60/301

(58) Field of Classification Search .................... 60/274, 60/277, 284, 285, 286, 295, 297, 301, 311
See application file for complete search history.

(56) References Cited

U.S. PATENT DOCUMENTS

| | | | |
|---|---|---|---|
| 4,721,083 A * | 1/1988 | Hosaka ........................ 477/111 |
| 5,899,778 A * | 5/1999 | Hiraoka et al. ............. 440/88 R |
| 6,079,204 A * | 6/2000 | Sun et al. ........................ 60/274 |
| 6,543,588 B1 * | 4/2003 | Raad ............................ 188/267 |
| 6,738,702 B2 * | 5/2004 | Kolmanovsky et al. ........ 701/54 |
| 6,865,883 B2 * | 3/2005 | Gomulka ....................... 60/295 |
| 7,220,217 B2 * | 5/2007 | Tamai et al. .................. 477/183 |

* cited by examiner

*Primary Examiner*—Binh Q Tran
(74) *Attorney, Agent, or Firm*—Bill C. Panagos; Rader, Fishman & Grauer PLLC

(57) ABSTRACT

A method and system for passively regenerating particulate filters, catalyze soot filters and NOx adsorber catalysts for a vehicle having a compression ignition engine having an engine control module (ECM) including an integrated engine and emission system map, and an integrated starter/alternator/flywheel/retarder assembly, comprising sensing the condition of the particulate filters, catalyzed soot filters, and NOx adsorber catalysts and generating an initiate cleaning cycle signal upon sensing that the filters and catalysts require cleaning, monitoring operation of the engine and vehicle to determine the engine speed and vehicle speed and generating an engine speed/vehicle speed operating signal, receiving the initiate passive cleaning engine cycle signal and the engine speed vehicle speed operating signal, and initiating engine control parameter adjustments to modify engine operation to promote passive regeneration of the filters.

15 Claims, 1 Drawing Sheet

METHOD AND SYSTEM FOR PASSIVE REGENERATION OF COMPRESSION IGNITION ENGINE EXHAUST FILTERS

FIELD OF THE INVENTION

The present invention relates to a system and method of passively regenerating diesel engine exhaust system filters and catalysts.

BACKGROUND

Diesel engine exhaust systems include particulate filters, catalyst soot filters, and NOx adsorber catalysts that clean exhaust and reduce engine emissions. There is a need to regenerate and desulfate exhaust system components on a regular basis for efficient operation.

Regeneration of diesel particulate filters requires heating the filters to temperatures of approximately 500° C. for a period of about 10 minutes. Regeneration of catalyzed soot filters requires heating the filters to temperatures of approximately 400° C. for a period of about 10 minutes. Desulfation of NOx adsorbers requires heating the catalysts to temperatures of approximately 700° C. for at least 5 minutes while operating the engine with a rich air/fuel mixture (excess fuel/no excess oxygen), that produces exhaust gas with higher concentrations of unburned hydrocarbons and carbon monoxide, and no oxygen. The prior art has proposed maintaining high catalyst temperatures by locating the catalyst components close to the engine turbocharger turbine outlet. This approach is not practical in on-highway vehicles due to space constraints.

In the past, active regeneration of the filters has been employed to regenerate compression ignition engine exhaust filters and catalysts. The preferred way to perform an active regeneration cycle is to heat the filter and catalyst components while the vehicle is at rest, for example, during a refueling stop. High exhaust temperatures are most effectively generated by loading the engine. However, it is difficult to adequately load an engine while a vehicle is at rest. The only loads on the engine when a vehicle is at rest are electrical loads such as those associated with lights and air conditioning systems and mechanical loads related to the operation of an air compressor, cooling fan and the idling torque load of the engine. These loads are negligible compared to the road loads encountered when a loaded vehicle is climbing a grade.

There is a need for an effective system for altering fuel/air ratios to effect a passive regeneration of a compression ignition engine exhaust system.

There is a need for an effective system for producing higher temperatures needed for passively regenerating exhaust system filter and catalyst components without unduly penalizing fuel economy.

There is a need for an effective system for altering engine operating parameters, such as, for example, fuel ignition timing and/or NOx/Particulate Material ratio maps to effect a passive regeneration of engine exhaust filters and catalysts.

These and other problems are addressed by applicant's invention and summarized below.

SUMMARY OF THE INVENTION

According to one aspect of the present invention, a system for passively regenerating particulate filters and catalyst soot filters is provided for compression ignition engines. The system includes an integrated assembly comprising a starter, an alternator, a flywheel and a retarder. An engine control module is adapted to receive a signal for initiating a passive regeneration cycle when the vehicle is in motion and the engine speed is above a predetermined threshold. In response to receiving the signal to initiate a passive regeneration cycle, the electronic control module adjusts engine operating parameters to effect the passive regeneration.

The system provides for sensing the condition of the particulate filters, catalyzed soot filters, and NOx adsorber catalysts and generating an initiate cleaning cycle signal upon sensing that the filters and catalysts require cleaning, monitoring operation of the engine and vehicle to determine the engine speed and vehicle speed and generating an engine speed/vehicle speed operating signal, receiving the initiate passive cleaning engine cycle signal and the engine speed vehicle speed operating signal, and, initiating engine control parameter adjustments to modify engine operation to promote passive regeneration of the filters.

The system also includes a sensor for sensing the temperature of the exhaust. When the sensor generates a signal indicating that the exhaust temperature is insufficient for regeneration, alters the fueling strategy and timing, which increases the temperature of the exhaust to effect the passive regeneration of the particulate filter.

The signal to initiate a regeneration cycle for a filter may be generated by a sensor that monitors the exhaust backpressure as an indication of the condition of the particulate filter. The signal to initiate a desulfation cycle of a NOx adsorber catalyst is initiated in response to signals received from exhaust NOx sensors, temperature sensors, air/fuel ratio sensors that are monitored by the engine control module during the desulfation cycle of a NOx adsorber catalyst. One engine operating parameter that is adjusted is the air/fuel ratio. Fueling and timing engine operating parameters can be adjusted by the engine control module for desulfation and passive regeneration.

A warning light may be activated in response to the engine control module receiving the signal to initiate a regeneration cycle. Upon activating the warning light, the engine control module may disable the engine unless an operator initiates the regeneration cycle. The operator is instructed by the warning light to activate the regeneration cycle by actuating a manual switch.

Referring to another aspect of the invention, a method of regenerating particulate filters, catalyzed soot filters and NOx adsorber catalysts for a vehicle having a compression ignition engine is provided. The compression ignition engine has an engine control module and an integrated starter/alternator/flywheel/retarder. The method comprises sensing the condition of the particulate filter, catalyzed soot filters, and NOx adsorber catalysts and generating an initiate cleaning cycle signal upon sensing that the filters or the catalysts require cleaning. Operation of the engine and the vehicle are monitored to determine whether the engine is idling and whether the vehicle is stopped, whereupon an engine idling/vehicle stop signal is generated. Upon receiving the initiate cleaning engine cycle signal and the engine idling/vehicle stop signal, the engine control module adjusts engine control parameters to bring the engine to a specified operating speed. The temperature of the exhaust gas stream is also sensed. Upon sensing that the exhaust gas temperature is insufficient for the regeneration of filters, a low temperature signal is generated. When the engine control module receives a low temperature signal, engine operating parameters are altered and the exhaust gas temperature is increased, thereby cleaning the filter.

Another method is to sense the particulate filter condition, modify the base engine exhaust NOx/Particulate Matter ratio map to a passive regeneration NOx/Passive Material map, thereby effecting a passive regeneration of the filters.

According to other aspects of the method of the present invention, a signal to initiate a regeneration cycle is generated by a sensor that monitors exhaust gas pressure. A signal to initiate a desulfation cycle may be generated based upon outputs from exhaust NOx sensors, temperature sensors, and air/fuel ratio sensors that are received by the engine control module that in turn initiates desulfation of an NOx adsorber catalyst. The engine control module may also adjust the air/fuel ratio when desulfating a NOx adsorber catalyst. Fueling and timing may also adjust the air/fuel ratio engine operating parameters may be adjusted by the engine control module.

A warning light may be activated in response to the engine control module receiving the signal to initiate a regeneration cycle. Upon activating the warning light, the engine control module the operator may be provided with a switch that will manually permit the operator to alter the operation of the vehicle and engine parameters to effect passive regeneration of the filters.

These and other aspects of the invention will be better understood in view of the attached drawings and the following detailed description.

DETAILED DESCRIPTION OF THE PREFERRED EMBODIMENT

Figure 1:
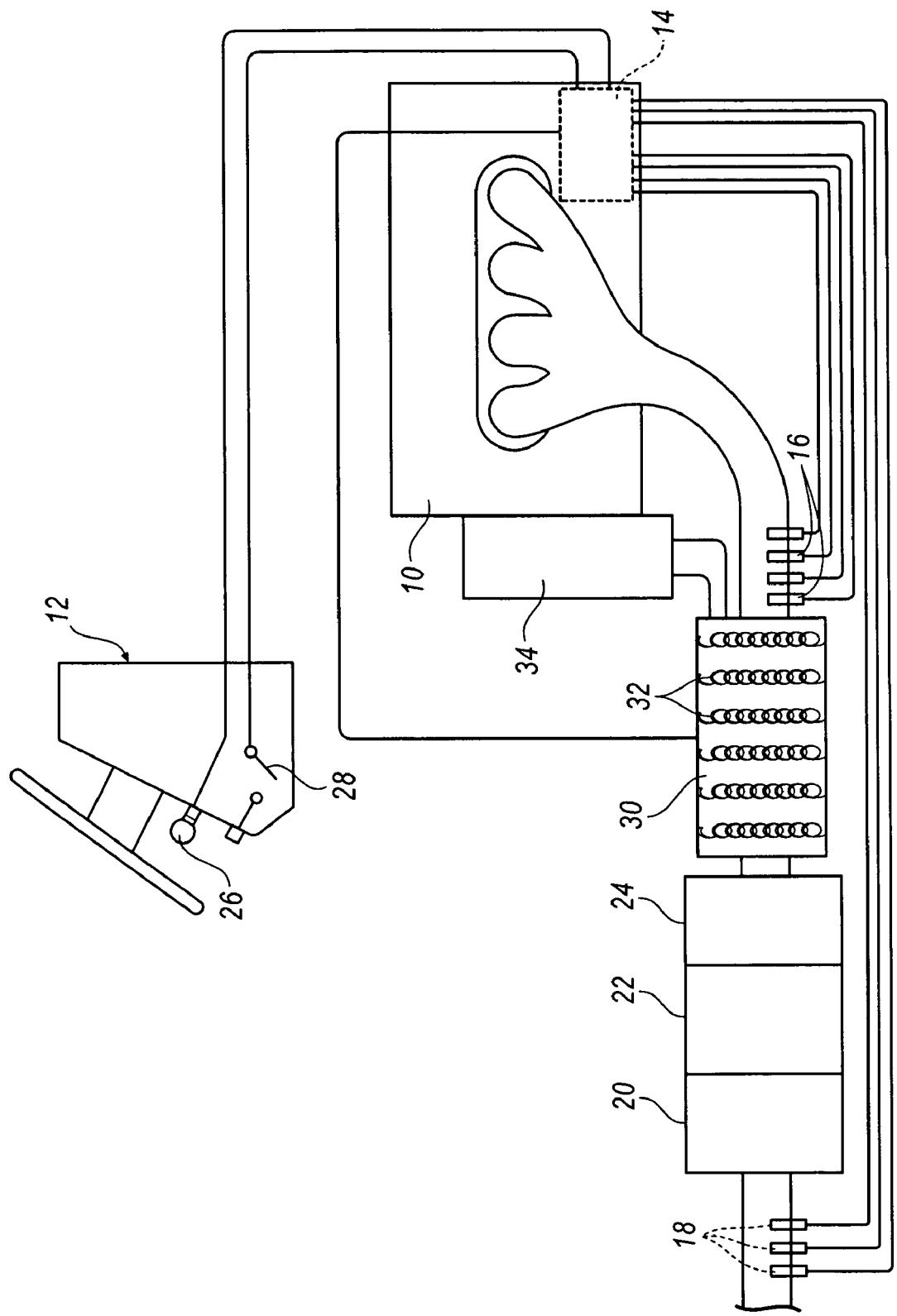
FIG. 1 is a schematic view of an engines and vehicle system of the present invention.

Referring now to the drawing, a compression ignition engine 10 for an on-highway vehicle 12 is shown schematically. The engine 10 includes an engine control module 14 that controls operation of the engine 10 and also controls exhaust component regeneration and desulfation according to the present invention as described below.

Exhaust manifold sensors 16 and tail pipe sensors 18 provide information to the engine control module (ECM) 14 that is used in controlling exhaust component regeneration. The exhaust manifold sensors 16 may provide information regarding NOx levels, air/fuel ratios (λ), temperature, and pressure. More specifically, the exhaust manifold sensors 16 and pipe sensors 18 may provide information regarding NOx, λ, and temperature that enable the ECM to detect an impending need for regeneration. The ECM may also monitor other engine operating parameters to determine the need for regeneration. A warning light 26 is activated upon detecting a need for regeneration of a particulate filter 20, catalyzed soot filter 22, or NOx adsorber catalyst 24. Illumination of the warning light prompts the operator to actuate a switch 28 to activate the regeneration/desulfation cycle at the next fuel stop.

When the vehicle stops for fuel, the engine 10 normally continues to idle. At this time, with the vehicle stopped, the ECM controls fueling, timing, governing and other engine operating parameters as required to bring the engine to a specified operating speed. If a NOx adsorber catalyst is to be regenerated, the air/fuel ratio is also controlled accordingly.

If the exhaust temperature is insufficient for regeneration/desulfation, a heater load bank 30 having heating elements 32 is activated. Activating the heating elements 32 raises the exhaust temperature by directly heating the exhaust. In addition, activating the heater load bank 30 increases the load on the engine 10 because electrical energy used by the heating elements 32 is obtained from the combined starter/alternator/flywheel/retarder assembly 34. The load applied by the integrated starter/alternator/flywheel/retarder assembly to the engine 10 increases the load on the engine 10 that in turn increases the exhaust temperature. In this way, the heat of the exhaust gas stream is efficiently increased to levels necessary to regenerate particulate exhaust filters 20 and catalyst soot filters 22 and desulfate NOx catalysts 24.

As set forth herein, in one aspect, the present invention can be understood to be method for passively regenerating particulate filters, catalyze soot filters and NOx adsorber catalysts for a vehicle having a compression ignition engine having an engine control module (ECM) including an integrated engine and emission system map, and an integrated starter/alternator/flywheel/retarder assembly. The method includes sensing the condition of the particulate filters, catalyzed soot filters, and NOx adsorber catalysts and generating an initiate cleaning cycle signal upon sensing that the filters and catalysts require cleaning, monitoring operation of the engine and vehicle to determine the engine speed and vehicle speed and generating an engine speed/vehicle speed operating signal, receiving the initiate passive cleaning engine cycle signal and the engine speed vehicle speed operating signal, and, initiating engine control parameter adjustments to modify engine operation to promote passive regeneration of the filters.

The method may also include initiating engine control parameters adjustments to modify base engine operation exhaust NOx/particulate matter ratio map in the ECM to a passive regeneration NOx/particulate matter regeneration map to promote passive regeneration of the filters. In another aspect, the method may include initiating engine control parameters to modify engine operation to provide for an exhaust stream having a minimum filter inlet temperature to promote passive regeneration of the filters.

In another aspect, the method of the present invention may include sensing the particulate filter condition by monitoring the exhaust gas backpressure. A high back pressure indicates that the particulate filter may be overburdened with trapped particulate matter, and the engine operating parameters may be modified according to the strategies described above to initiate a passive regeneration of the filters.

The method may also include monitoring the temperature of the exhaust gas stream. It is understood that below certain thresholds, filters will not regenerate. When these conditions are senses, the method may include increasing engine speed or load to increase the heat of the exhaust gas, or may include activating an auxiliary heater element in the exhaust system to heat the system to the required temperature. It is also understood that the activation of the heater elements will increase the load of the engine, thereby contributing to the increased heat of the generated exhaust gas.

The method of the present invention further includes initiating engine control parameter changes to modify fueling and timing parameters to promote passive filter regeneration. It is known that changes in timing will produce exhaust gas that has different composition of NOx and particulate material. Advancing the timing will result in elimination of the particulate material, and increase in the temperature of the exhaust gas, and that increased exhaust gas temperature will contribute to the passive regeneration of the filter. Concomitantly, the reduction or elimination of the particulate materials in the exhaust stream during this phase of the engine operation permit the particulate filters to be regenerated in a minimum amount of time. Increased NOx levels can be accommodated by providing for an auxiliary NOx adsorber system to be used during these periods of passive regeneration of the particulate filter. Once the filter has regenerated, normal fuel injection timing is resumed and the NOx absorber in the main exhaust system is used to adsorb any NOx created during normal operation of the engine.

As previously stated, the invention further comprises activating a warning light in response to the engine control module receiving the signal to initiate a passive filter regeneration cycle. A manual switch may be provided for activation by the operator to initiate passive regeneration of the particulate filter.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention as set forth in the appended claims.

I claim:

1. A method for passively regenerating particulate filters, catalyzed soot filters and NOx adsorber catalysts for a vehicle having a compression ignition engine having an engine control module (ECM) including an integrated engine and emission system map, and an integrated starter/alternator/flywheel/retarder assembly, comprising:
    sensing the condition of the particulate filters, catalyzed soot filters, and NOx adsorber catalysts and generating an initiate cleaning cycle signal upon sensing that the filters and catalysts require cleaning;
    monitoring operation of the engine and vehicle to determine the engine speed and vehicle speed and generating an engine speed/vehicle speed operating signal;
    receiving the initiate passive cleaning engine cycle signal and the engine speed vehicle speed operating signal; and
    initiating engine control parameter adjustments to modify base engine operation exhaust NOx/particulate matter ratio map in the ECM to a passive regeneration NOx/particulate matter regeneration map to promote passive regeneration of the filters.

2. The method of claim 1, wherein initiating engine control parameters modifies engine operation to provide for an exhaust stream having a minimum filter inlet temperature to promote passive regeneration of the filters.

3. The method of claim 1, wherein sensing said filter condition includes monitoring the exhaust gas backpressure.

4. The method of claim 1, wherein sensing said filter condition includes monitoring the temperature of the exhaust gas.

5. The method of claim 1, wherein initiating engine control parameter changes includes modifying fueling and timing parameters to promote passive filter regeneration.

6. The method of claim 1, further comprising activating a warning light in response to the engine control module receiving the signal to initiate a passive filter regeneration cycle.

7. The method of claim 1, further comprising actuating a manual switch by the operator upon activation of the warning light.

8. The method of claim 1, further comprising activating an auxiliary heating element in the exhaust system to increase the temperature of the exhaust gas stream.

9. A system for passively regenerating particulate filters, catalyzed soot filters and NOx adsorber catalysts for a compression ignition engine of a vehicle, comprising:
    a starter,
    an alternator,
    a flywheel,
    a retarder, and
    an engine control module adapter to receive a signal to initiate a regeneration cycle, wherein the engine control module adjusts the base engine operation exhaust NOx/particulate matter ratio map in said electronic control module to a passive regeneration NOx/particulate matter regeneration map after receiving the initiate regeneration cycle signal when the vehicle is in motion and the engine is operating above a predetermined engine speed, wherein the signal to initiate the regeneration cycle is initiated in response to signals received from at least one exhaust gas temperature sensor, at least one exhaust gas back pressure sensor, and at least on air fuel ratio sensor by the engine control module.

10. The system of claim 9, wherein the exhaust gas temperature sensor generates a low temperature signal indicating that the exhaust temperature is below a predetermined level that is sufficient for regeneration, wherein an engine operation parameter is adjusted to cause the exhaust gas temperature to exceed said predetermined level to permit passive regeneration of said filter.

11. The system of claim 9, wherein the signal to initiate a passive regeneration cycle for a filter is generated by a sensor in the exhaust that monitors exhaust back pressure.

12. The system of claim 9, wherein the engine operating parameters adjusted by the engine control module are fueling and timing.

13. The system of claim 9, wherein a warning light is activated in response to the engine control module receiving the signal to initiate a regeneration cycle.

14. The system of claim 13, wherein an operator activates the regeneration cycle by actuating a manual switch upon activation of the warning light.

15. The system of claim 9, further including an auxiliary heating element in the exhaust system to heat the exhaust gas to permit passive regeneration of the filter and catalysts.

* * * * *